No. 654,580.
H. H. VENABLE.
AUTOMATIC LAMP FILLER AND MEASURING CAN.
(Application filed Nov. 1, 1899.)
Patented July 24, 1900.
(No Model.)
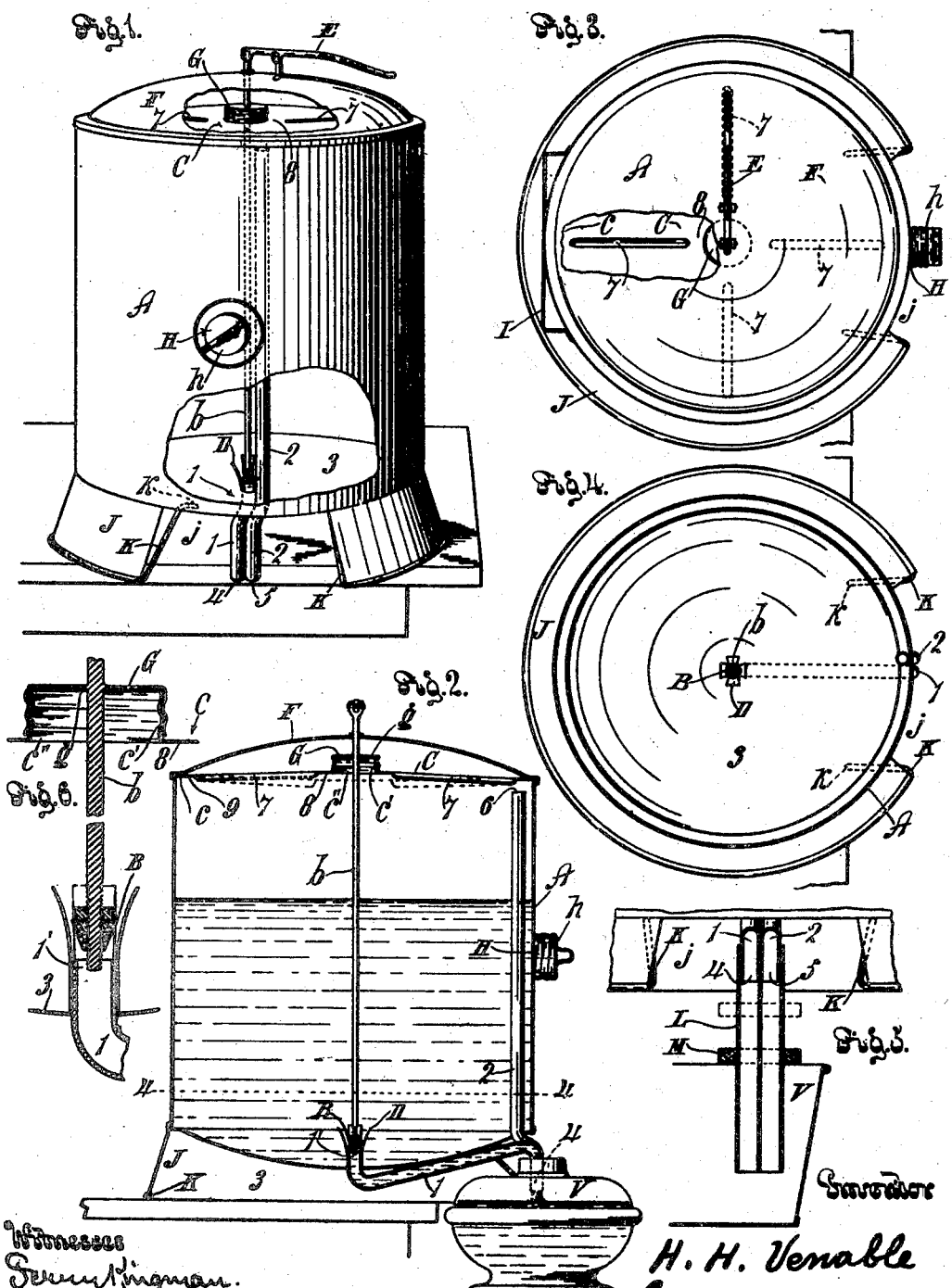

UNITED STATES PATENT OFFICE.

HENRY HERMAN VENABLE, OF REDONDO, CALIFORNIA.

AUTOMATIC LAMP-FILLER AND MEASURING-CAN.

SPECIFICATION forming part of Letters Patent No. 654,580, dated July 24, 1900.

Application filed November 1, 1899. Serial No. 735,533. (No model.)

*To all whom it may concern:*

Be it known that I, HENRY HERMAN VENABLE, a citizen of the United States, residing at Redondo, in the county of Los Angeles and State of California, have invented a new and useful Automatic Lamp-Filler and Measuring-Can, of which the following is a specification.

The object of my invention is to provide means by which the liquid in any receptacle being filled from a can will automatically cut off the flow of liquid from the can, thereby to prevent any more than the required amount of liquid to pass from the can and absolutely do away with all danger of filling to overflowing lamps and other vessels.

In my invention I employ a receptacle provided with an outlet and with an air-inlet, a valve for closing the outlet, and adjustable means connected with the valve for operating the same and being interposed between the external atmosphere and the chamber of the receptacle, whereby the said means will be operated by the atmospheric pressure to close the valve when the air within the chamber is rarefied, my invention depending upon the principle that the escaping liquid will rarefy the air to a sufficient degree for this purpose after the air-inlet has been closed.
My invention is applicable with any means for closing the air-inlet, and thus allowing the escaping liquid to rarefy the atmosphere within the chamber.

My invention also includes means whereby a vessel of known capacity can be used for accurately measuring different quantities of liquid less than that which the vessel is designed to measure.

By means of my invention it becomes possible to fill a vessel to any determined depth in the dark, so that retailers can dispense highly-inflammable liquids, such as gasolene, after night without danger, the necessity of a light for seeing the liquid being dispensed with.

The accompanying drawings illustrate my invention as applied to be operated by the liquid rising in any vessel into which it flows from the outlet. In a separate view an adjustable gage is shown by means of which the device can be set to fill a vessel to any desired depth.

Figure 1 is a perspective view of my invention as applied for domestic use ready for operation. Parts are broken away to expose interior construction. Fig. 2 is a vertical mid-section. Dotted lines indicate the position of the diaphragm when the valve is closed. Fig. 3 is a plan of the invention. Fig. 4 is a sectional plan on line 4 4, Fig. 2. Fig. 5 is a fragmental detail to show the adjustable device for gaging varying depths of liquid in the receiving vessel. Fig. 6 is a fragmental detail showing the valve and valve-rod.

A indicates the storage-receptacle, which may be a can or any other form of vessel, the same being normally hermetically closed except at the outlet 1 and air-inlet 2, and said outlet and air-inlet being arranged to be closed and opened, as will be fully set forth hereinafter.

B indicates a valve for closing the outlet.

C indicates a diaphragm constituting the adjustable means connected with the valve B by a rod *b* for operating said valve and being interposed between the external atmosphere and the chamber of the receptacle and arranged to hold the valve in its closed position when the diaphragm is in its inward position, as indicated in dotted lines in Fig. 2. The diaphragm C is resilient and is dished, so that when in normal position its center will stand either outside or inside the plane of the rim *c* of the diaphragm. The diaphragm is preferably stiffened between its rim and the center, being left resilient at the rim and at the center only, so that when the diaphragm is sprung from either side to the other of said plane of the rim it will spring uniformly without crinkling, and is thus made to carry the valve-rod *b* axially toward and from the inner mouth *l'* of the outlet *l*.

D indicates guides around the inner mouth of the outlet to guide the valve B into such mouth. The valve is preferably tapered, so that it will enter the inner mouth of the outlet more readily. The play of the resilient diaphragm between its inward and its outward position is more than sufficient to fully open and positively close the valve. In practice the valve is adjusted to close before the diaphragm has reached its fullest inward position, so that when the valve is closed the resiliency of the diaphragm is exerted to hold the valve positively closed.

Preferably the bottom 3 of the vessel is concave and the inner mouth of the outlet 1 is located at the center of the bottom and the valve-rod $b$ is fastened at the center of the diaphragm and plays along the axis of the vessel. The outlet 1 extends downward at its outer end, as indicated at 4, and the air-inlet 2 preferably has its outer mouth 5 substantially at the same level with the outer mouth of the outlet 1. The outlet and inlet are respectively formed of pipes, and the inlet-pipe 2 terminates near the top of the vessel.

E indicates a lever for conveniently operating the valve-rod to open the valve.

F indicates a cover fitted on the top of the receptacle to protect the diaphragm and to form a support for the fulcrum of the lever E. Preferably the valve-rod $b$ is carried by a screw-cap G, which screws upon a nipple $c'$, projecting upward from the diaphragm C, and the valve-rod passes through an opening $c''$ within the nipple. The screw-cap G is provided with packing $g$, so as to hermetically close the opening $c''$. The valve-rod $b$ is rigidly connected to the screw-cap G and can be removed by unscrewing the cap when the cover F is taken off of the vessel for this purpose.

H indicates a filling-opening in the front of the can, the same being hermetically closed by a screw-cap $h$.

I indicates legs at the upper end of the can to hold the can from rolling when the can is laid down for the purpose of filling.

J indicates an outwardly-flaring base for the can. This base is cut away, as at $j$, at the front in order to allow the lamp or other vessel V to be inserted beneath the can to receive the pipes 1 2 when the liquid is to be drawn from the can.

K indicates a stiffening-wire for the base. The base is formed of sheet metal, the lower rim of which is bent around the stiffening-wire, and the inner ends $k$ of the stiffening-wire are bent up and soldered or otherwise made fast to the bottom of the can, thus to give greater strength to the base at the edges of the opening.

In practical operation to fill the can it will be tilted back to rest upon the legs I and the rear of the base J, thus bringing uppermost the side of the can at which are the outer and inner mouths 5 6 of the air-inlet. The valve B being closed, the cap $h$ is removed and the vessel is then filled in the ordinary way. A funnel may be inserted in the opening H, and the vessel can be filled rapidly as the air is readily vented through the pipe 2. When the vessel is filled, the cap $h$ is screwed into place to hermetically seal the vessel, and the vessel is then brought to the upright position. (Indicated in solid lines in Figs. 1 and 2.) In order to draw liquid from the vessel, the operator will place the lamp or other vessel V to be filled in position, with the outlet 4 and inlet 5 projecting inside the vessel V below the top thereof. Then the lever E will be pressed to withdraw the valve B from the inner mouth of the outlet and to throw the diaphragm into its updrawn or outwardly-extended position. (Indicated in solid lines in Fig. 2.) The liquid readily flows out through the outlet 1, and the vacuum is readily supplied by air entering through the inlet 2. When the liquid in the lamp or other vessel being filled reaches the outer mouth of the inlet, the ingress of air is immediately stopped, so that the continued outflow of the liquid through the outlet produces a rarefaction of the air within the chamber of the receptacle A. The atmospheric pressure upon the diaphragm then forces the diaphragm inward, thus pushing the valve into the mouth of the outlet and preventing any further outflow of the liquid.

In manufacturing the diaphragm it will be stamped in the concave form shown in Fig. 2; but I have found in ordinary practice that an ordinary diaphragm made of sheet metal is liable to spring in an irregular manner, so that the valve-rod will be thrust sidewise to a greater or less extent. I avoid this liability by providing radial stiffeners 7, extending from near the rim of the diaphragm to near the center thereof. A plain space, as at 8, 9, however, is allowed to intervene between the ends of the stiffeners and the rim $c$ and the opening $c''$, so that the diaphragm will spring freely while the stiffeners or rods 7 prevent it from crinkling. These stiffeners may be formed in various ways, as by means of rods or metal strips or otherwise, as desired; but I prefer to form them in the manner shown in the drawings, in which they are formed by corrugations stamped in the diaphragm when it is pressed into its concave form.

L indicates an attachment for extending the pipes 1 2 downward to any desired extent and to form a support for the adjustable gage projection M, which slides up and down on the attachment to stop against the upper rim of the vessel to be filled, thus to gage the height to which the level of the liquid will rise in the vessel being filled before the inlet will be shut to allow the rarefaction of air to occur, as above stated, thereby to cause the outlet to be closed by the valve. The adjustable gage M is a projection slipping friction-tight upon the downwardly-extending pipes 1 2 or their downward extensions L. The can is to be provided with the attachment when it is designed for use where the liquid to be drawn from the receptacle is to be measured. For use in filling lamps the attachment will not ordinarily be employed.

It is not necessary for the closing of the valve that the air-inlet be stopped by the rising liquid. The valve can be pushed down by the lever or independently of the lever, or the air-inlet may be closed by any means—such as, for instance, the finger of the attendant—and the diaphragm will be pressed in, and the valve thereby closed, as soon as the outflow of liquid has caused sufficient rarefaction of the air in the chamber.

What I claim, and desire to secure by Letters Patent of the United States, is—

1. The combination of a receptacle provided with an outlet and with an air-inlet; a valve for closing the outlet; and adjustable means connected with the valve, for operating the same and being interposed between the external atmosphere and the chamber of the receptacle, whereby the same will be operated by the atmospheric pressure to close the valve when the air within the chamber is rarefied.

2. The combination of a receptacle provided with an outlet and with an air-inlet; a resilient diaphragm interposed between the chamber of the receptacle and the external air; and a valve connected with the diaphragm and arranged to close the outlet when the diaphragm is in its inward position.

3. The combination of a receptacle provided with an outlet and with an air-inlet, said air-inlet projecting outside the receptacle to be closed by the liquid rising in the vessel to be filled; a valve for closing the outlet; and adjustable means connected with the valve for operating the same and being interposed between the external atmosphere and the chamber of the receptacle, whereby the same will be operated by the atmospheric pressure to close the valve when the air-inlet is stopped and the air within the chamber is rarefied by the escape of the outflowing liquid.

4. The combination of a receptacle provided with an outlet and with an air-inlet; a resilient diaphragm interposed between the chamber of the receptacle and the external air; a valve connected with the diaphragm and arranged to close the outlet when the diaphragm is in its inward position; and a lever connected with the valve to open the same.

5. The combination of a receptacle provided with an outlet and with an air-inlet; a resilient diaphragm interposed between the chamber of the receptacle and the external air; a valve connected with the diaphragm and arranged to close the outlet when the diaphragm is in its inward position; and a pneumatic valve-closer comprising two downward extensions of the liquid-outlet and the air-inlet; and a gage projection slidably mounted on said downward extensions to contact with the receiving vessel.

In testimony whereof I have signed my name to this specification, in the presence of two subscribing witnesses, at Los Angeles, California, this 29th day of September, 1899.

HENRY HERMAN VENABLE.

Witnesses:
JAMES R. TOWNSEND,
FRANCIS M. TOWNSEND.